United States Patent [19]

Kaczeus

[11] Patent Number: 5,218,496
[45] Date of Patent: Jun. 8, 1993

[54] MAGNETIC DISK DRIVE WITH REDUCED DISK-TO-DISK SPACING AND IMPROVED ACTUATOR DESIGN

[75] Inventor: Steven L. Kaczeus, San Jose, Calif.
[73] Assignee: Kalok Corporation, Sunnyvale, Calif.
[21] Appl. No.: 623,319
[22] Filed: Dec. 6, 1990
[51] Int. Cl.⁵ .................. G11B 5/54; G11B 21/08; G11B 21/20
[52] U.S. Cl. ................................ 360/106; 360/104
[58] Field of Search .................... 360/104–106, 360/109, 98.01, 97.01; 369/215, 219, 244

[56] References Cited

U.S. PATENT DOCUMENTS

| | | | |
|---|---|---|---|
| 4,150,407 | 4/1979 | Dijkstra | 360/106 |
| 4,196,456 | 4/1980 | Manzke et al. | 360/106 |
| 4,330,806 | 5/1982 | Iwabuchi et al. | 360/106 |
| 4,331,991 | 5/1982 | Morehouse et al. | 360/106 |
| 4,595,963 | 6/1986 | Shimaoka | 360/106 |
| 4,775,908 | 10/1988 | Ycas | 360/106 |
| 4,796,122 | 1/1989 | Levy et al. | 360/106 |
| 4,805,055 | 2/1989 | Wright | 360/106 |
| 4,835,641 | 5/1989 | Maeda | 360/104 |
| 4,967,293 | 10/1990 | Aruga et al. | 360/106 |
| 5,016,131 | 5/1991 | Riggle et al. | 360/106 |
| 5,050,026 | 9/1991 | Goss | 360/106 |

FOREIGN PATENT DOCUMENTS

| | | | |
|---|---|---|---|
| 59-191175 | 10/1984 | Japan | 360/104 |
| 60-29986 | 2/1985 | Japan | 360/104 |

Primary Examiner—Stuart S. Levy
Assistant Examiner—Jefferson Evans
Attorney, Agent, or Firm—Skjerven, Morrill, MacPherson, Franklin & Friel

[57] ABSTRACT

A magnetic disk drive employs a head actuator structure in which the heads are angularly offset from each other around the disk surfaces. This permits the disks to be more closely spaced in an enclosure, thereby resulting in more disk capacity in a given disk enclosure envelope, or a decrease in the enclosure envelope required for a given disk capacity.

12 Claims, 6 Drawing Sheets

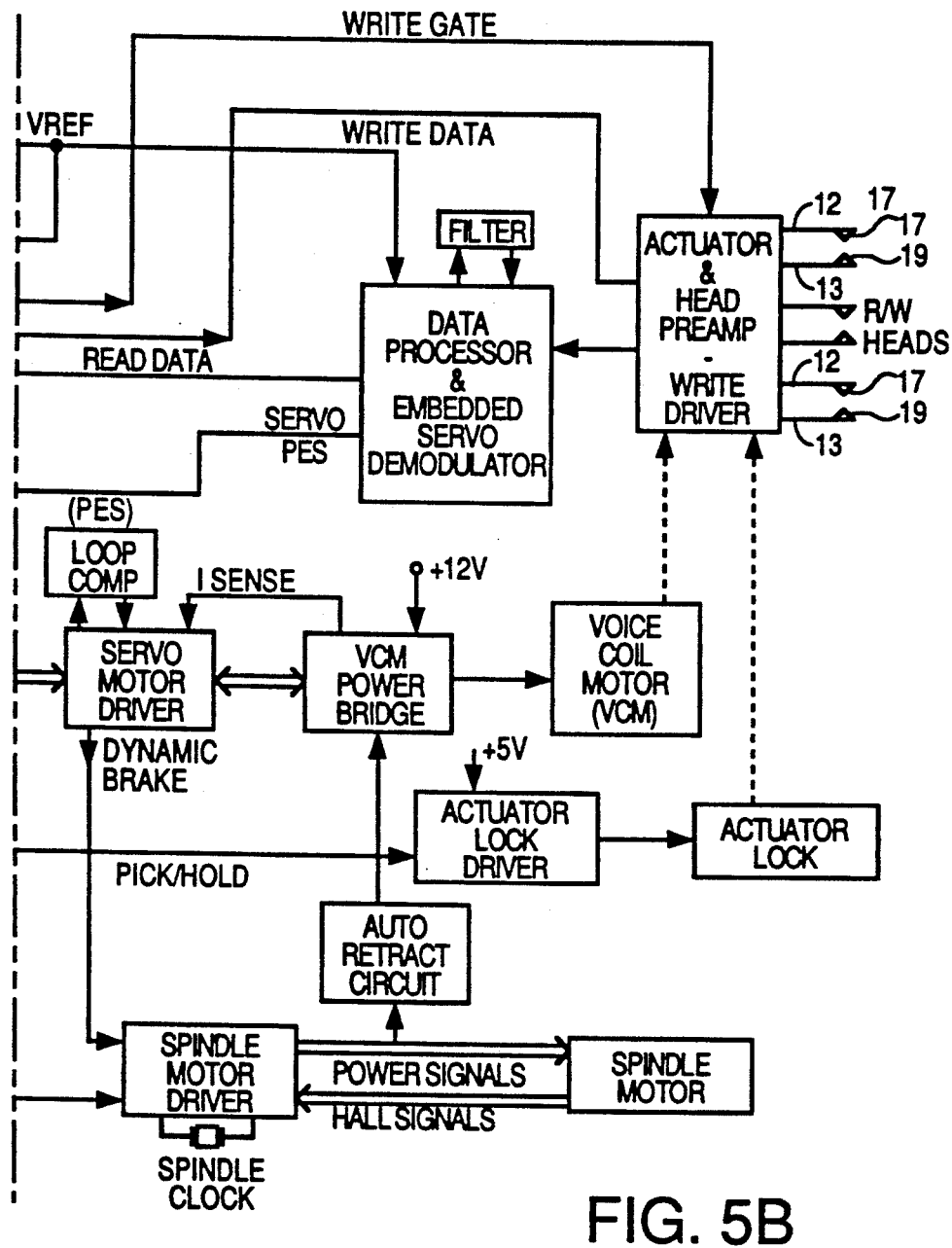
FIG. 5B
KEY TO FIG. 5
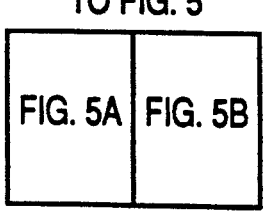

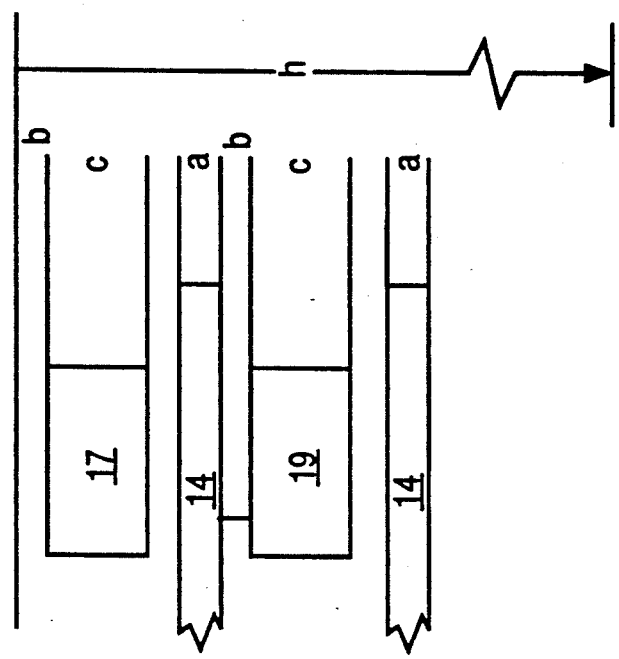
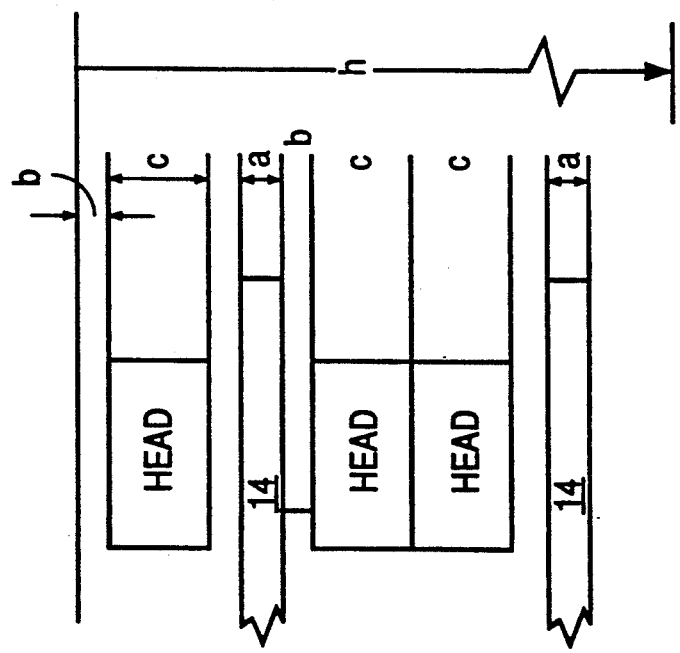
FIG. 6B
FIG. 6A
(PRIOR ART)

MAGNETIC DISK DRIVE WITH REDUCED DISK-TO-DISK SPACING AND IMPROVED ACTUATOR DESIGN

BACKGROUND OF THE INVENTION

1. Field of the Invention

This invention relates to data storage systems employing magnetic disk drives for use in data processing systems. More specifically, the invention pertains to magnetic disk drives having reduced packaging size, increased storage capacity, and faster access time.

2. Prior Art

A data storage system of the type herein described typically includes one or more rotating circular magnetic disks having recording surfaces on opposite sides of the disks. Information is recorded on these surfaces as a plurality of concentric tracks containing user data and other types of information. At least one read/write head is utilized for transferring information to and from each of the different recording surfaces of the disks. An actuator mechanism of some type is employed to move the heads in unison to position them at selected different radial track locations on the disk surfaces.

Most current disk drives employ some type of servo positioning information recorded on the disks to assist in first locating and then maintaining the heads at the desired radial track location on the disk surfaces. The locating operation is referred to as track seeking, and the maintaining operation is referred to as track following.

Those portions of the disk recording surfaces which do not contain servo positioning information are dedicated to stored data utilized by the using data processing system. The servo positioning information may be interleaved with user data in circumferentially spaced sectors on each of the recorded tracks, or, alternatively, all servo information may be contained on a dedicated servo surface of the recording medium, while the user data is contained on the remaining surfaces of the recording medium. In a magnetic disk drive of the former type, commonly called a sector servo drive, servo positioning information can be read by the same magnetic head that reads the user data. The arrangement and pattern of the servo positioning information may be varied according to the particular track seeking and track following algorithm employed by the disk drive system.

SUMMARY OF THE PRESENT INVENTION

With the advancement of personal computer technology, there is a continuing requirement for higher capacity and faster access disk drive storage devices within the established drive enclosure dimensional configurations. One feature of the present invention enables the designer of rigid disk drives to significantly increase the number of disks and disk surfaces within a prescribed enclosure volume, thereby increasing the capacity of the disk drive device.

In a conventional disk drive with a rotary actuator, the magnetic heads (top and bottom) are attached to one arm and disposed in operation closely adjacent opposing surfaces of adjacent disks. In this type of mounting, both the upper and lower heads are positioned in a single plane (a vertical plane if the disks are disposed horizontally), one head on top of the other. Thus, the minimum spacing between adjacent disks in this configuration is that which is necessary to accommodate the two magnetic heads essentially stacked on top of each other.

In order to decrease the required disk separation in the present invention, the top and bottom heads are spaced or offset from each other circumferentially of the disk surfaces by mounting them on first and second angularly spaced head support members. All of the top heads are aligned in one plane at right angles to the disk surfaces to magnetically cooperate with the group of top disk surfaces, while all of the bottom heads are aligned in another plane at right angles to the disk surfaces but circumferentially spaced or offset from the plane in which the top heads are located, to magnetically cooperate with the group of bottom disk surfaces. The whole arm assembly is one unit, and preferably when the top heads are located on the outside diameter of the disks, the bottom heads are at the inside diameter, and vice versa.

With this arrangement, the disk separation can be significantly reduced and more disks can be placed within the same disk enclosure envelope. This design configuration allows an increase in the storage device capacity without increasing the disk enclosure envelope dimensions and without requiring an increase in the disk areal recording density.

Since the disk velocity component is opposite for the top and bottom heads as employed in the present invention, one of the typical characteristics of the design is that the orientations of the magnetic sliders in which the heads are mounted on flexures are 180 degrees apart.

Another important feature of the present invention is the use of a unique symmetrical moving magnet voice coil design so that the performance of the disk drive is significantly improved by a reduction of head access time from one track to any other track. There are two types of voice coil actuators used in the rigid disk drive industry, moving coil actuators and moving magnet actuators. The more common moving coil actuators, in which, as the name implies, the coil is the moving element, have the characteristics of low stiffnesses, low resonant frequencies and complex moving flexible circuit connection designs. On the other hand currently used moving magnet coil actuators have the inherent problem of a constant preload generated by the magnet. This undesirable load requires additional system stiffness consideration. Furthermore, many moving magnet coil designs have a natural detent position, making a uniform force constant value difficult to achieve.

The present design, because of its symmetrical moving magnet design configuration, eliminates the problems associated with the prior art preload problems referred to above. Additionally, the design of this invention offers high stiffness characteristics, with very high resonant frequencies, and since the coil is a stationary element, it is a simple electro-mechanical design. The present design also provides a substantially uniform flux density in the magnetic gap for all actuator positions and has a simple counter-balance feature and latch mechanism. Further, because the coil and magnets of the present actuator design are positioned on either side of the actuator axis, rather than along that axis as in prior art configurations, a more compact envelope design is achieved.

The spindle motor employed in the present design preferably is an in-hub type device supported by a stationary shaft on top and supported on the bottom by the cover and disk drive base. Many prior art spindle designs employ a ferrofluidic type of liquid seal at both ends of the motor. These seals are necessary to contain the vapor particles emitted from the lubricant used in the bearings for lubrication purposes. If sealants are not used, the lubricant vapors can be deposited onto the magnetic disk surfaces, causing a "stiction" phenomenon which is an undesirable condition in disk drives. Ferrofluidic seals are complex devices and are sensitive to higher air pressure differences and contamination. Most of the spindle motor failures in present disk drives are caused by thes ferrofluidic seals. The prior art ferrofluidic seals can be eliminated in the present disk drive system by using a special type of lubricant with an extremely low evaporation rate even at higher environmental temperatures. A perfluoroalkylpolyether type of lubricant, such as that supplied under the trade name Krytox by DuPont Chemical Corporation, is a good lubricant for this application.

In order to reduce the coefficient of friction between the disk surfaces and the magnetic heads during contact sliding, the disk medium surface may also contain a very thin film of perfluoroalkylpolyether lubricant, which may be applied to the disk surface in a liquid form. Thus, any additional perfluoroalkylpolyether vapor deposition on the disk surfaces from the spindle motor bearings will not alter the frictional or stiction properties of the two cooperating head and disk surfaces.

BRIEF DESCRIPTION OF THE DRAWINGS

FIGS. 5A and 5B, when placed side by side, represent a block diagram of a disk drive and controller system in which the present invention may be employed; and FIGS. 6A and 6B are diagrams illustrating the reduction in required disk enclosure space resulting from the present invention.

DESCRIPTION OF THE PREFERRED EMBODIMENT

Figure 1:
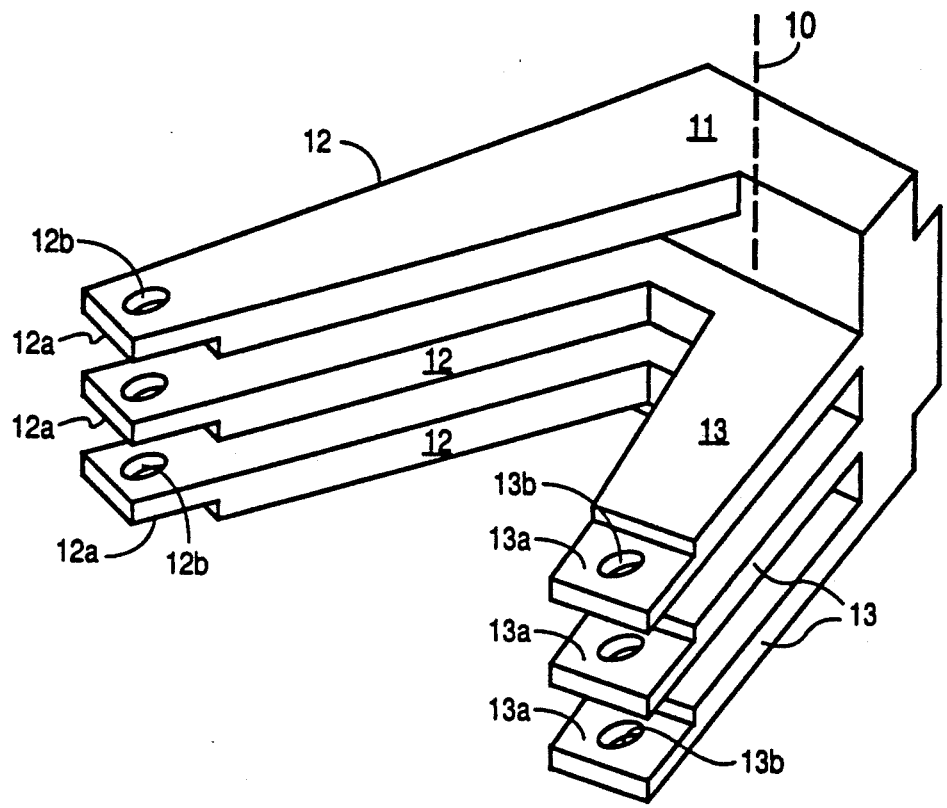
FIG. 1 is a perspective view of a magnetic head supporting member in accordance with the present invention.

Referring to FIG. 1, there is shown a movable head supporting member 11 in accordance with the present invention having a vertical center axis 10 and having first and second angularly spaced head support arms. Preferably, member 11 includes a first plurality of arms 12 and a second plurality of arms 13 which are angularly spaced from arms 12. Each of arms 12 has a shoulder portion 12a at one end thereof to form flexure mounting surface for the attachment of arm flexure members to which the magnetic heads are secured, as is well known in the art. In FIG. 1, shoulders 12a each face downwardly so that the heads secured thereto Will face downwardly. Similarly, each of arms 13 has an upwardly facing shoulder portion 13a at one end thereof to form a flexure mounting surface to which the flexure and head are secured.

Each of shoulder portions 12a, 13a are provided with openings therein, 12b, 13b, respectively, for use in securing the arm flexure members thereto. Head support member 11 is made of a light-weight material, such as aluminum or magnesium, and preferably has a coefficient of thermal expansion matching that of the substrate material of the magnetic recording disks. Head support member 11 is connected to and forms part of an actuator mechanism for moving the magnetic heads to different track locations on a disk surface, as will be described in more detail below in connection with FIG. 3.

Figure 2:
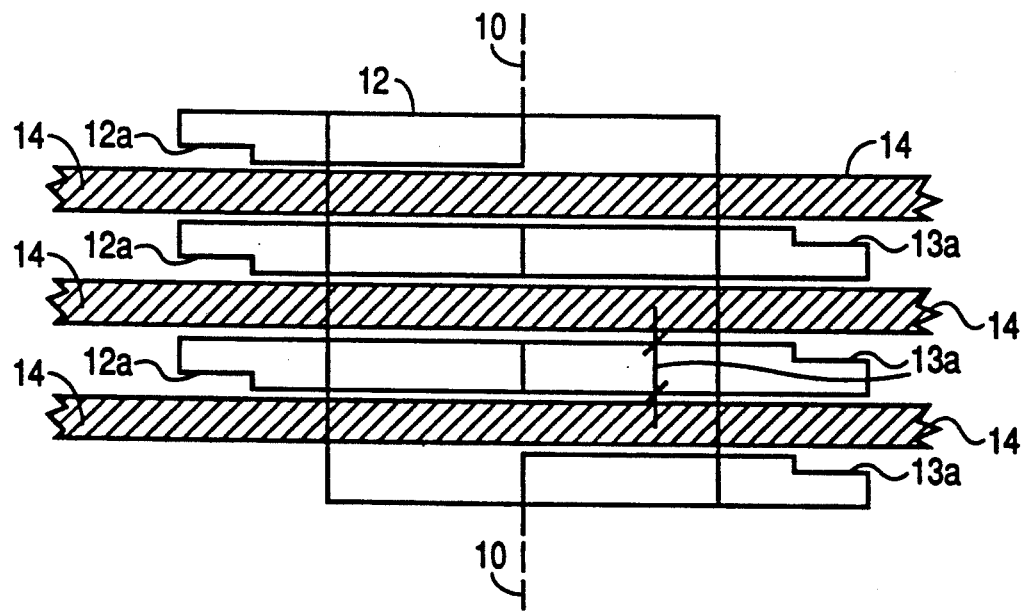
FIG. 2 is a side elevation cross sectional view

As shown in the cross-sectional elevation view of FIG. 2, with arms 12, 13 of member 11 inserted between a plurality of magnetic recording disks 14, the flexure mounting surfaces 12a of arms 12 will face the top surfaces of disks 14, while flexure mounting surfaces 13a will face the bottom surfaces of disks 14. Consequently, the magnetic heads secured to arms 12 will cooperate magnetically with the disks' upper surfaces, while the heads mounted to arms 13 will cooperate with the disks' lower surfaces.

It will be seen that the topmost arm 12 and its associated magnetic head will magnetically cooperate with the top surface of the upper disk 14 in the disk array, while for the next pair of arms 12, 13 in the array, arm 13 and its associated magnetic head will cooperate with the lower surface of the upper disk 14, while its associated arm 12 and magnetic head will coact with the top surface of the second disk 14 in the array.

Referring to FIGS. 6A and 6B, the following calculations illustrate the improvement in space requirements in a disk enclosure resulting from the present invention. FIG. 6A shows the prior art dual head approach to head mounting in which both top and bottom heads are aligned in a single plane through the disks. FIG. 6B illustrates the offset head configuration of this invention. In FIGS. 6A and 6B $b$ = Installation gap
$a$ = Disk thickness
$c$ = Head slider thickness
$h$ = Total height occupied by heads and disks
$n_i$ = Number of disks in the present design
$n_c$ = Number of disks in prior art design The equations for FIGS. 6A and 6B are:

$$h = n_i(a+2b+c)+2b+c$$

$$h = n_c(a+2b+2c)+2b$$

The ratio of the number of disks in each configuration is given by:

$$\frac{n_i}{n_c} = \frac{(h-2b-c)(a+2b+2c)}{(h-2b)(a+2b+c)}$$

As an example, assume that:

$a = 0.030$ in $b = 0.010$ in $c = 0.067$ in $n_i = 12$

Total Height Required Using 12 Disks in Present Invention $$h = n_i(a + 2b + c) + 2b + c$$
$$= 12(.030 + .020 + .067) + .020 + .067$$
$$h = 1.491 \text{ inches}$$

Total Height Required Using 8 Disks In Prior Art Configuration $$h = 8(0.03 + 0.02 + 0.134) + 0.02$$

$$h = n_c(a + 2b + 2c) + 2b$$

$$h = 1.492 \text{ inches}$$

$$\frac{n_i}{n_c} = \frac{(h - 2b - c)(a + 2b + 2c)}{(h - 2b)(a + 2b + c)} =$$

$$\frac{(1.491 - .02 - .067)(.03 + .02 + .134)}{(1.491 - .02)(.03 + .02 + .067)}$$

$$\frac{1.404 \times .184}{1.471 \times .117} = \frac{.2583}{.1721}$$

$$\frac{n_i}{n_c} = 1.500$$

The above equations show that by using a typical disk thickness, installation clearance and head slider thickness, the novel offset head design of this invention provides space for 50% more disks within the same disk drive height dimension, or, looking at it alternatively, provides 50% more data capacity for identical recording technologies than a conventional dual head actuator design.

Figure 3:
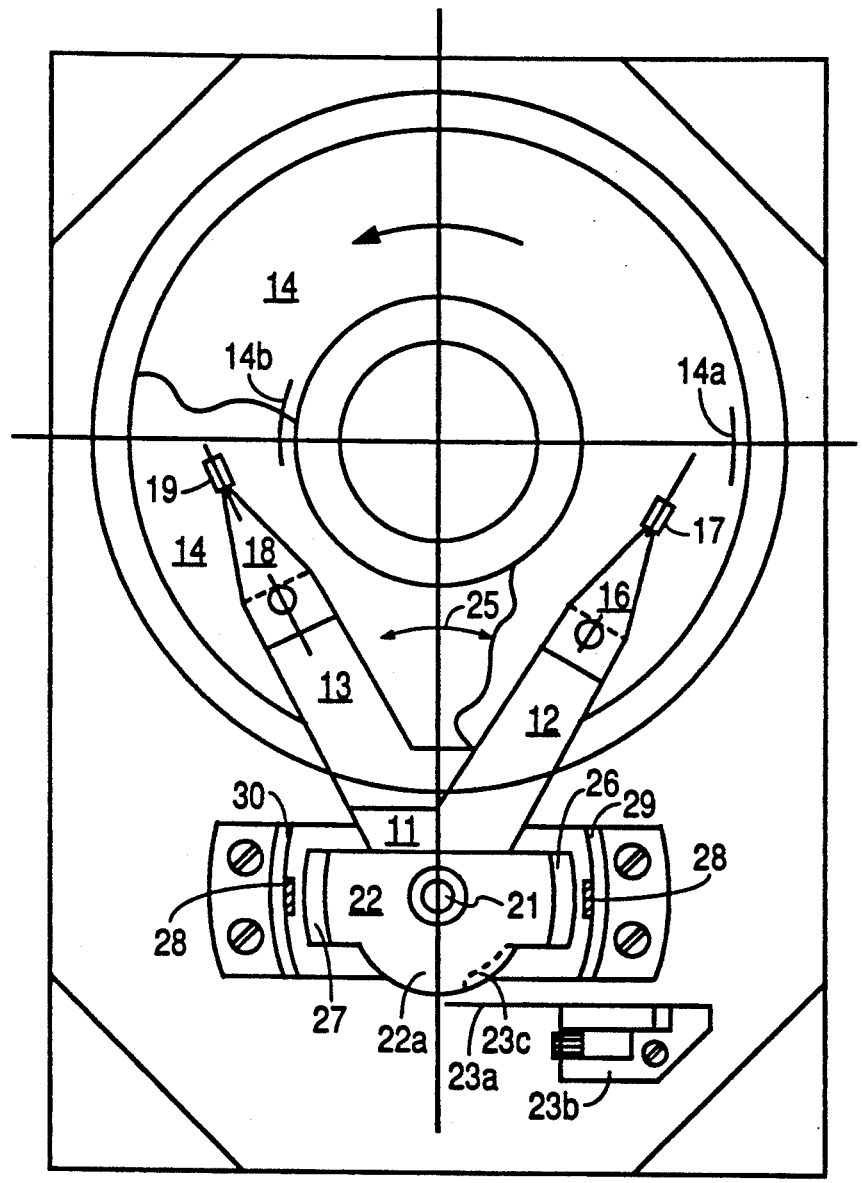
FIG. 3 is a top plan view, partly broken away, illustrating a disk drive embodying the present invention.

FIG. 3 is a top plan view showing portions of the disks and actuator mechanism in a disk drive employing the present invention. In FIG. 3, a flexure mechanism 16 is shown secured to the flexure mounting surface 12a of an arm 12, and a magnetic head 17 is secured to the end of flexure 16 to magnetically cooperate with the top surface of a disk 14, as discussed above. With a portion of upper disk 14 broken away in FIG. 3, it can be seen that an arm 13 carries a flexure member 18, at the end of which is mounted a magnetic head 19 for magnetically cooperating with a lower surface of a disk 14.

FIG. 3 shows the head supporting member 11 connected to the moving magnet actuator of the present invention. The movable actuator assembly includes a magnetic body member 22 to which member 11 is secured. The actuator assembly pivots on a central shaft 21 on axis 10 to produce movement of arms 12, 13 and their associated magnetic heads 17, 19 across the surfaces of disks 14 in the directions indicated by double headed arrow 25.

Figure 4A:
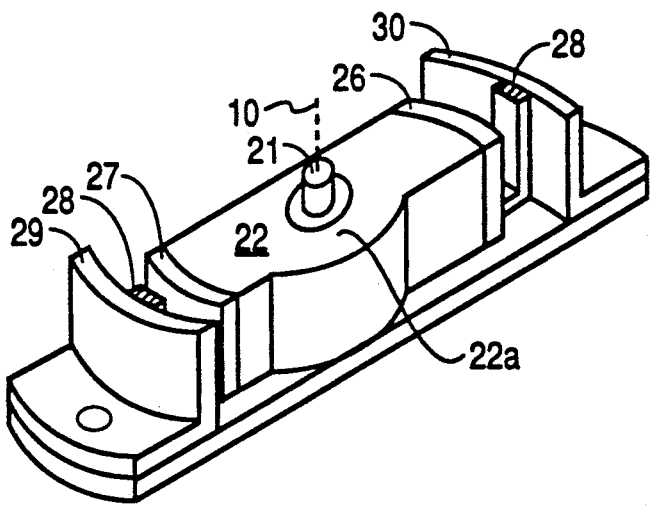
FIGS. 4A, 4B and 4C are perspective views, partly in section, showing different components of the actuator assembly of this invention.
Figure 4B:
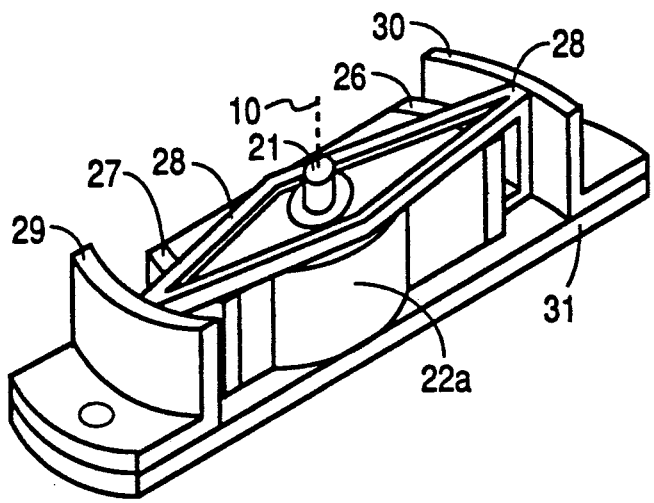

The actuator assembly includes a pair of equal strength magnets 26, 27 which magnetically interact with the magnetic field produced by current in a stationary electrically energized coil 28 surrounding magnets 26, 27. An important feature of the present invention is the curvatures of both the outer surfaces of magnets 26,27 and the corresponding surfaces of the magnetic return path members. This is best seen in FIG. 4A where moving magnets 26,27 are secured to body member 22 of the actuator mechanism. Magnets 26,27 are spaced by gaps from corresponding magnetic frame members 29,30, and fixed coil 28 is disposed in these gaps, as best seen in FIG. 4B. The outer surfaces of magnets 26,27 are curved convexly, as shown, and the surfaces of members 29,30 facing magnets 26,27 have a concave curvature matching the convex curvature of the outer surfaces of magnets 26,27.

The result of this structure is that the gap between magnets 26,27 and members 29,30 is of constant size regardless of the rotational position of magnets 26,27 relative to the curved inner surfaces of member 29,30. This means that the torque of the actuator is constant over a wide range of positions of the actuator. This is in contrast to prior art structures where the facing surfaces of either or both the actuator magnets or the spaced magnetic frame members are flat. This has the undesirable result that the size of the magnetic gap between the magnets and the frame members varies as a function of the rotational position of the magnets relative to the frame members, thereby producing a varying actuator torque for different rotational positions of the actuator. The design of this portion of the present actuator represents a balancing between the desire to minimize the size of the gap between the magnets and the frame members in order to increase the magnetic efficiency, and the need to allow sufficient space in the gap to permit insertion of the magnets during assembly of the structure.

A further feature of this invention is the design of the movable portion of the actuator to perform the dual functions of improving magnetic efficiency and providing a counterbalancing mass to offset the mass of the arms, flexures and heads. This is best seen in FIGS. 3 and 4A where body member 22 is shown having an extended, rounded portion 22a on the side opposite to the side of member 22 to which arms 12,13, flexures 16,18 and heads 17,19 are attached. One function provided by portion 22a is to provide additional flux path space for magnetic flux travelling through member 22 between magnets 26,27. In the absence of enlarged portion 22a, flux through member 22 would tend to undesirably saturate the member in the area of shaft 21 since this area would represent an area of reduced magnetic cross-section. However, the additional flux path provided by portion 22a reduces or eliminates this saturation problem.

An additional function provided by enlarged portion 22a is to provide additional mass to counterbalance the mass of the arms, flexures and heads mounted on the other side of member 22. This results in a dynamic balance of the movable portion of the actuator assembly about the axis of shaft 21.

Figure 4C:
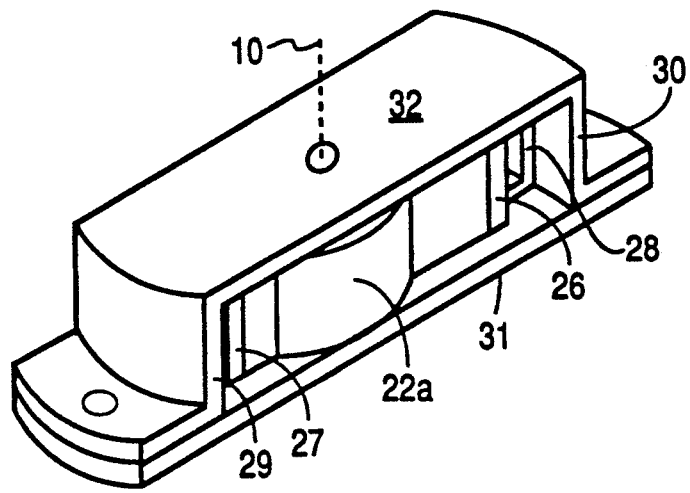

FIG. 4C shows the completed magnetic assembly including a magnetic base member 31 and a magnetic top member 32 which includes members 29,30 having the concavely curved surfaces.

Because of the symmetrical design of the magnet structure of this invention, problems of preloading encountered with prior art moving magnet actuators are eliminated, resulting in a uniform force constant value. The present design also provides a high stiffness characteristic with a desirable very high resonant frequency.

It can also be seen from FIGS. 3 and 4A that the present design places the magnetic elements on an axis relative to the central axis 10 which is perpendicular to the axis extending through the actuator arms and flexures. This results in a shorter overall length of the actuator along the actuator axis than the prior art structures in which the magnetic elements are disposed on the actuator axis.

The drive also includes a latch mechanism for locking the movable actuator assembly in a fixed position when the device is in transit or otherwise powered down. As shown in FIG. 3, such a mechanism may include a solenoid operated latching arm 23a which, when solenoid 23b is energized, is held out of contact with a detent notch 23c in the movable actuator. When solenoid 23b is deenergized, as in a power-down situation, latch arm 23a is spring-urged into engagement with detent notch 23c when the actuator and heads have been moved to the park position, to latch the actuator and heads in this position.

As is well known in the art, servo positioning information from a surface of disks 14 is converted to electrical signals and supplied to coil 28 to produce a magnetic field from coil 28 which interacts with the magnetic fields of magnets 26, 27 to cause the actuator assembly to move magnetic heads 17, 19 to the desired radial track position relative to the surfaces of disks 14.

When the drive is powered down, it is desirable to move heads 17, 19 to a non-information-bearing portion of disks 14 to avoid possible damage to the information-bearing portions from physical contact with heads 17, 19. Such areas are known as "parking" or "landing" zones and are shown in FIG. 3 as a parking zone 14a for the heads 17 associated with the upper surfaces of disks 14 and a parking zone 14b for the heads 19 associated with the lower surfaces of disks 14.

With the parking zone for the bottom heads at the inside diameter of the disk surface, the top heads will park at the outside diameter of the disk surface. This parking of the heads on the outside diameter results in a requirement for a higher disk drive spindle motor starting torque. In order to reduce or eliminate this requirement for a higher spindle motor starting torque, oscillatory movement of the arm and its associated parked heads before the spindle motor start-up can be implemented.

The present invention offers particular advantages when used with disk drives which employ the so-called multi-zone recording (MZR). In that type of recording, the recorded bit density increases as a function of the radial track position, the bit density increasing outwardly from the center of the disk. The usual approach is to divide the disk into separate zones as a function of radial track position and to increase the number of sectors in each of the zones. In one such MZR system, the disk is divided into zones having 40, 50, 60 and 70 sectors per track, respectively, moving outwardly from the disk center.

Since the rotational speed of the disk is constant, it can be seen that the bit rate and data rate at the outer zones will be higher than at the inner zones. In the 40, 50, 60 and 70 sectors/track example, two prior art heads located in the 70 sectors/track area can read 2×70=140 sectors for each disk revolution without having to move the heads. On the other hand, two prior art heads operating in the 40 sectors/track area will be capable of reading only 2×40=80 sectors per revolution without changing their radial position on the disk. Thus, in prior art MZR systems employing two heads having the same radial position on the disks, there is a difference in total data available for a given zone location of the heads.

With the present invention employing angularly offset heads, the data rate for the disk drive is balanced between the MZR zones. That is, if one head in the present invention is positioned on the outer 70 sector/track area and the other head is located in the 40 sector/track area, the combined data capacity for the two heads without changing their location is 70+40=110 sectors. Similarly, if two heads in accordance with this invention are located over areas of 50 and 60 sectors/track, respectively, the combined data capacity available without moving the heads is still 50+60=110 sectors. This results in a desirable constant value for drive performance in terms of total data capacity available at any position of the two heads.

Figure 5A:
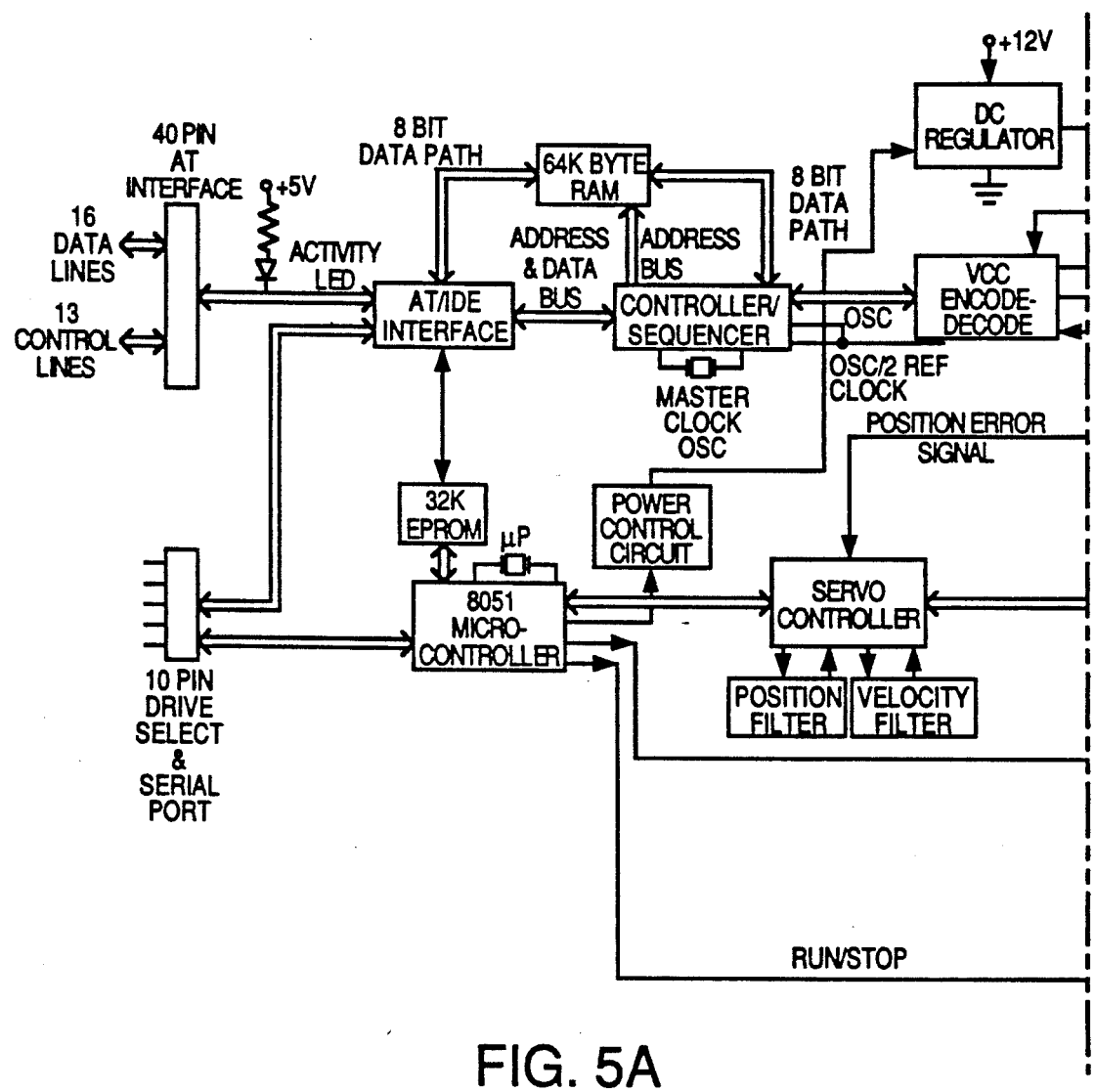

FIGS. 5A and 5B represent a block diagram of the elements making up a typical disk drive system, including a disk drive controller, in which the present invention may be employed. Top and bottom magnetic heads 17, 19 and top and bottom arms 12, 13 are symbolically represented in FIG. 5B as connected to a block 35 which includes the head actuator assembly of FIG. 3 as well as head read preamplifier circuitry and write driver circuitry. As is well known in the art, the read preamplifier circuitry is used to pre-amplify the signals obtained from heads 17, 19 in reading information from the surfaces of disks 14. The write driver circuitry is employed to supply current to heads 17, 19 for recording or writing on the surfaces of disks 14.

The electrical portion of the actuator mechanism including coil 28 is represented by voice coil motor (VCM) element 40. VCM 40 is energized from a VCM power bridge element 50 which in turn is controlled by a servo motor driver 33. Element 33 is controlled from a servo controller element 34 which receives an input servo position error signal (PES) from a servo demodulator element in block 36. The servo demodulator operates to extract position information from the disk servo pattern read by the selected one of heads 17, 19. Servo controller element 34 may have associated therewith a position filter element 37 and a velocity filter element 38, depending on the particular servo algorithm being employed in the positioning system.

An actuator lock element 39 controlled through an actuator lock driver 41 from microcontroller 42 is operable to energize and deenergize the actuator locking solenoid latch 23 in FIG. 3.

A spindle motor 43 for rotating disks 14 is energized from a spindle motor driver 44. Hall signals from a Hall Effect sensor element on the spindle motor 43 are supplied to driver circuitry 44 to provide an indication of the index or home position of disks 14 once each disk revolution, as is well known in the art. Auto retract circuitry 60 provides a signal, preferably generated by the back EMF of spindle motor 43, to provide for retraction of the actuator assembly to the park position in the event of a power failure which could result in a loss of disk rotation and consequent damage to information-bearing portions of the surfaces of disks 14. A dynamic brake line is supplied from servo driver 33 to spindle motor driver 43 to dynamically brake spindle motor 44 on power down.

Read signals from the read preamplifier in element 35 are supplied through the data processor portion of element 36 as read data to a voltage controlled oscillator (VCO) element 46 to decode the read data. The decoded data is supplied through a controller/sequencer 47 on an 8 bit data path to a random access memory (RAM) element 48. The read data from RAM 48 is supplied through an interface element 49 to an interface 51 to the using system.

For writing, write data is supplied through interface elements 49, 51 to RAM 48 and controller/sequencer 47 from which it is supplied to block 46 for encoding as write data. The encoded write data is supplied to block 35, under the control of the write gate line, for energizing the write driver circuitry to provide write current to the selected one of heads 17, 19.

I claim:

1. A magnetic recording disk drive including a plurality of recording disks having sets of recording surfaces on opposites sides thereof for the recording and reproduction of information thereon:

a plurality of magnetic heads for recording on and reproducing information from said disk surfaces;

a head supporting member for supporting said magnetic heads, said supporting member having a first set of magnetic head support arms and a second set of magnetic head support arms, with said two sets of support arms being angularly spaced from each other relative to said disk surfaces;

means for mounting one of said magnetic heads on each of said head support arms, each of said heads being mounted on a support arm on an axis extending through the center axis of said support arm; and actuator means for moving said head supporting member and said heads to position said magnetic heads at different radial positions relative to said disk surfaces.

2. Structure in accordance with claim 1 in which said disks have a set of to surfaces and a set of bottom surfaces.

3. Structure in accordance with claim 1 in which one of said heads mounted on one of said first set of head support arms and one of said heads on one of said second set of head support arms are both located between an adjacent pair of said disk surfaces, said head on said first arm being angularly offset around said disk surfaces from said head on said second arm.

4. Structure in accordance with claim 1 including means for moving said heads to a parking position on said disk surfaces, said heads mounted on said first set of support arms having a parking position near the outer diameter of said disks and said heads on said second set of support arms having a parking position near the inner diameter of said disks.

5. An actuator assembly for moving one or more magnetic heads relative to the surface of a magnetic recording disk comprising:

a movable actuator member for carrying said heads, said actuator member including a body member to which said heads are attached;

magnet means having two spaced pole portions attached to said body member and movable therewith;

a pair of stationary magnetic member spaced from said pole portions of said magnetic means;

a stationary electric coil disposed between said movable magnet means and said stationary magnetic members, said stationary coil having two portions located between said pole portions and said pair of stationary magnetic members; and means for supplying current to said coil to generate a magnetic field which interacts with a magnetic field generated by said magnet means to produce movement of said magnet means and said actuator member relative to said stationary magnetic members, the distance between said movable magnet means and said stationary magnetic members remaining constant for all positions of said magnet means.

6. An actuator assembly in accordance with claim 5 in which said magnet means have outer surfaces which are convexly curved in the direction of said stationary magnetic members, and said stationary magnetic members have concavely curved surfaces facing said convexly curved surfaces of said magnet means.

7. An actuator assembly in accordance with claim 5 in which said heads are attached to said body member along a given axis, and said magnet means are attached to said body member along an axis perpendicular to said given axis.

8. An actuator assembly in accordance with claim 5 in which said heads are attached to said body member on one side thereof, said body member having an enlarged portion on the side opposite to said one side to provide additional mass to counterbalance the mass of said heads.

9. An actuator assembly in accordance with claim 8 in which magnetic flux passes through said body member from said magnet means, and said body member has a shaft extending through said body member in the path of said flux, said enlarged portion of said body member providing additional volume for the passage of said flux.

10. A magnetic recording disk drive including a plurality of recording disks having a first set of recording surfaces on one side of said disks and a second set of recording surfaces on the opposite side of said disks for the recording and reproduction of information thereon:

a plurality of magnetic heads for recording on and reproducing information from said disk surfaces;

a head supporting member for supporting said magnetic heads, said supporting member having first magnetic head support arms and second magnetic head support arms, with said first and said second support arms being angularly spaced;

means for mounting one of said magnetic heads on each of said head support arms, each of said heads being mounted on a support arm on an axis extending through the center axis of said support arms;

said magnetic heads mounted on said first head support arms being aligned to face said first set of said disk surfaces, and said magnetic heads mounted on said second head support arms being aligned to face said second set of said disk surfaces opposite to said disk surfaces faced by said magnetic head on said first head support arms; and actuator means for moving said head supporting member and said heads to position said magnetic heads at different radial positions relative to said disk surfaces.

11. Structure in accordance with claim 1 in which each of said sets of recording surfaces has information recorded thereon in physically spaced zones, the density of information recorded in said zones increasing from zone to zone outwardly from the center of the recording surface, a pair of said magnetic heads mounted on said angularly spaced head support arms magnetically cooperating with different ones of said zones, whereby said pair of heads provides access to a constant amount of said information on said disk surfaces at any one of said radial positions relative to said disk surfaces.

12. Structure in accordance with claim 11 in which each of said disk surfaces has four zones therein.

* * * * *